United States Patent [19]
Onozawa

[11] Patent Number: 5,388,166
[45] Date of Patent: Feb. 7, 1995

[54] IMAGE DRAWING APPARATUS
[75] Inventor: Yuji Onozawa, Ebina, Japan
[73] Assignee: Fuji Xerox Co., Ltd., Tokyo, Japan
[21] Appl. No.: 137,799
[22] Filed: Oct. 19, 1993
[30] Foreign Application Priority Data
Nov. 30, 1992 [JP] Japan ................... 4-343496
[51] Int. Cl.⁶ .............................................. G06K 9/00
[52] U.S. Cl. ........................ 382/22; 345/17; 345/130; 395/139; 382/47
[58] Field of Search .......... 382/22, 47; 345/16, 345/17, 24, 25, 26, 130; 395/139, 141, 142, 143, 102

[56] References Cited
U.S. PATENT DOCUMENTS

| | | | |
|---|---|---|---|
| 4,853,971 | 8/1989 | Nonura | 382/22 |
| 4,885,786 | 12/1989 | Anderson et al. | 345/130 |
| 5,105,472 | 4/1992 | Murayama | 382/22 |
| 5,228,097 | 7/1993 | Kumagai | 382/22 |

FOREIGN PATENT DOCUMENTS
4-15771  1/1992  Japan .

Primary Examiner—Leo H. Boudreau
Attorney, Agent, or Firm—Finnegan, Henderson, Farabow, Garrett & Dunner

[57] ABSTRACT

An image drawing apparatus wherein the processing time and the memory capacity are reduced and jaggy is reduced to improve the image quality. A command received at an image data inputting section is sent to a vector production section, in which, when the command is a font, it is converted into vector data using data stored in a font data storage section. A graphic edge list production section produces, from the vector data, an edge list processed in the magnification of n times. The edge list is referred to in units of n scanning lines by a gray scale processing section, by which a new edge list with which a portion determined to be an edge of a figure is to be drawn in a half tone when necessary is produced. The second edge list is successively processed by a clipping processing section and an edge list merging section and then converted into raster data, which are outputted to an outputting apparatus such as a printer.

6 Claims, 13 Drawing Sheets

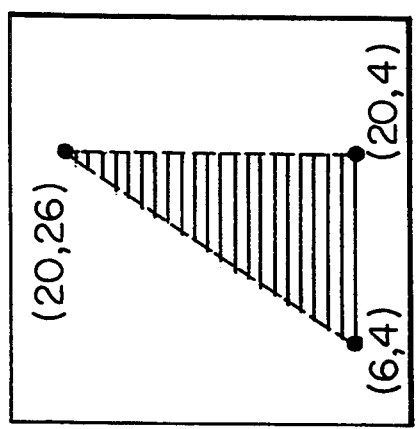
FIG. 3(C)
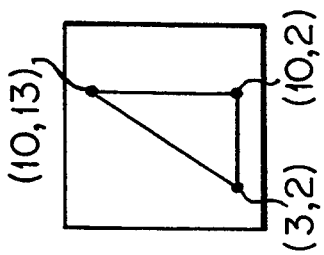
FIG. 3(A)
FIG. 3(B)

IMAGE DRAWING APPARATUS

BACKGROUND OF THE INVENTION

1. Field of the Invention

This invention relates to an image drawing apparatus which converts input data into raster information and outputs an image having gradations.

2. Description of the Related Art

In recent years, in the fields of computer graphics, DTP and so forth, apparatus has been developed to convert input graphic data or code data-into raster information such as a bit map and output it to an outputting apparatus such as a display or a printer which can provide a gradation output or a color output.

When input data are to be converted into bit map information and outputted, an outputting apparatus having a low resolution has a drawback in that the degradation of the picture quality by jaggy is remarkable. In order to cope with the problem, it is a conventional practice to produce an enlarged image obtained by raster conversion, process the enlarged image by filter processing to convert it into an image having gradations to smooth an edge portion and output the image. However, very much processing time is required and a memory of a large capacity is required to produce an enlarged image and process the enlarged image by filter processing. Also a technique wherein a gradation at an edge portion is detected from an inclination of a straight line and outputted has been proposed and is disclosed in Japanese Patent Laid-Open Application No. Heisei 4-15771. The technique, however, has a drawback in that, since image drawing processing proceeds along a straight line, when image drawing is performed for each scanning line, much processing time is still required and image drawing for scanning line is not performed at a high rate.

SUMMARY OF THE INVENTION

It is an object of the present invention to provide an image drawing apparatus which decreases the processing time and the memory capacity and decreases jaggy to enhance the picture quality.

In order to attain the object described above, according to an aspect of the present invention, there is provided an image drawing apparatus for converting input data into raster information and drawing an image in accordance with the raster information, which comprises edge list production means for producing an edge list from the input data, gray processing means for producing a second edge list having density information in accordance with an edge list for a plurality of successive lines, and outputting processing means for performing outputting processing in accordance with the second edge list produced by the gray processing means.

With the image drawing apparatus, since conversion into a bit map is not involved but gradation processing at an edge portion of an image is performed by the gray processing means using an edge list, raster information of a high quality whose jaggy has been reduced can be outputted at a high rate with a reduced memory capacity. Further, since the processing is performed for each edge list for a plurality of successive lines, conversion for each scanning line can be performed at a high rate.

According to another aspect of the present invention, there is provided an image drawing apparatus for converting input data into raster information and drawing an image in accordance with the raster information, which comprises edge list production means for producing, from the input data, an edge list enlarged to n times in magnitude, n being a natural number equal to or greater than 2, gray processing means for producing a second edge list having density information in accordance with an edge list for n successive lines, and outputting processing means for performing outputting processing in accordance with the second edge list produced by the gray processing means.

With the image drawing apparatus, since conversion into a bit map is not involved but enlargement processing of an image by the edge list production means and gradation processing at an edge portion of an image by the gray processing means are performed using an edge list, raster information of a high quality whose jaggy has been reduced can be outputted at a high rate with a reduced memory capacity. Further, since the processing is performed, using edge lists enlarged to n times in magnitude, for each edge list for n lines, conversion for each scanning line can be performed at a high rate.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 3(A), 3(B) and 3(C) are diagrammatic views showing an edge list produced by enlargement to twice by the image drawing apparatus of FIG. 1;

DETAILED DESCRIPTION OF THE PREFERRED EMBODIMENT

Figure 1:
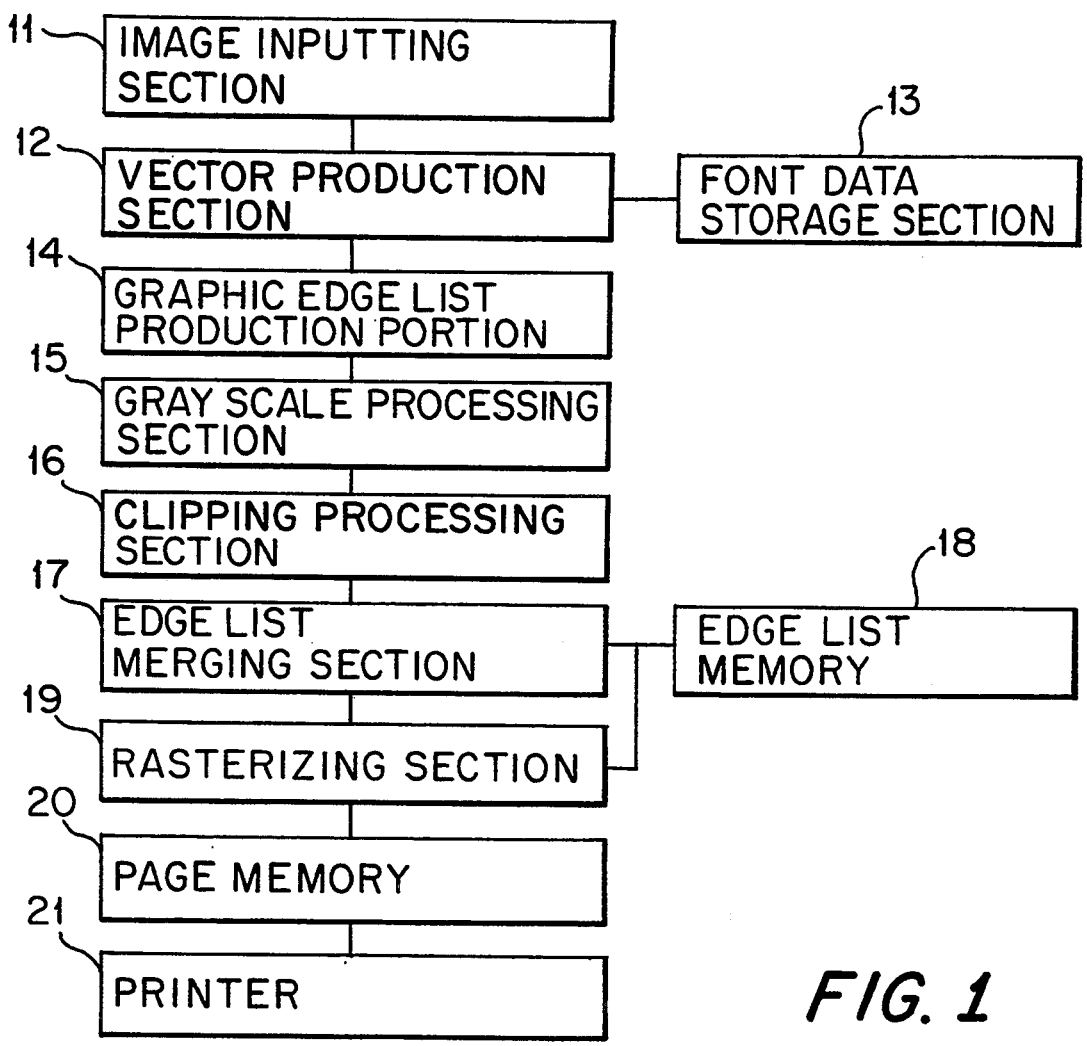
FIG. 1 is a block diagram of an image drawing apparatus showing a preferred embodiment of the present invention.

Referring first to FIG. 1, there is shown in block diagram an image drawing apparatus according to a preferred embodiment of the present invention. The image drawing apparatus shown includes an image data inputting section 11, a vector production section 12, a font data storage section 13, a graphic edge list production section 14, a gray scale processing section 15, a clipping processing section 16, an edge list merging section 17, an edge list memory 18, a rasterizing section 19, a page memory 20 and a printer 21.

Figure 2:
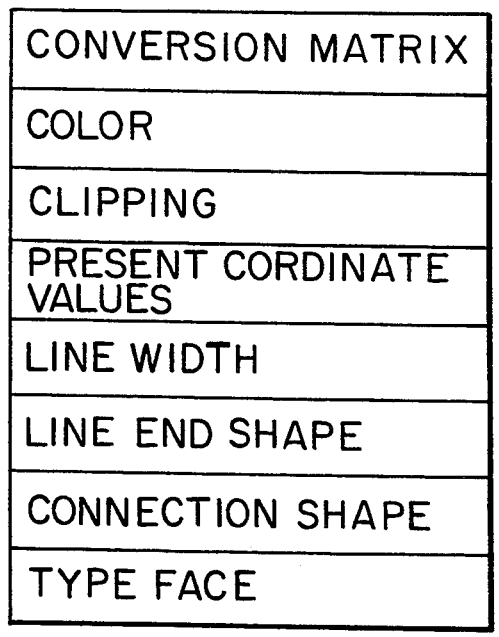
FIG. 2 is a table showing parameters used in the image drawing apparatus of FIG. 1.

The image data inputting section 11 receives a command inputted thereto, interprets the command, executes processing in accordance with the command and sends the interpretation to the vector production section 12. The command to be received includes primitives such as graphics data, character code data and raster data and parameter data necessary for image drawing such as a color designation and a coordinate conversion matrix. When the command received is a font, a character code is sent from the image data inputting section 11 to the vector production section 12; when the command received is an image, raster data are sent; and when the command is graphics, vector data are sent. FIG. 2 is a table showing parameters. The parameters which are transmitted as a command include, for example, as shown in FIG. 2, elements of a conversion matrix which are used for coordinate conversion, a color of an image to be drawn, an area for which clipping is to be performed, coordinate values at present which are used upon designation of a relative coordinate, a width of a line to be drawn and a shape of an end of the line, a shape of connection at a connecting point when lines to be drawn are to be connected to each other, and a type face when a character is to be drawn. Those parameters are stored into a storage section (not shown) and thereafter used suitably by several sections.

The vector production section 12 produces vector data in accordance with a type of data for image drawing transmitted thereto from the image data inputting section 11. When the data for image drawing are a font, vector font data stored in the font data storage section 13 are recalled in response to a character code and processed by coordinate conversion processing or some other suitable processing using a parameter such as a conversion matrix, and resulting vector data are sent to the graphic edge list production section 14. When the data to be drawn are graphics data, the vector data processed as they are by processing such as coordinate conversion and then sent to the graphic edge list production section 14.

The graphic edge list production section 14 processes the vector data transmitted thereto from the vector production section 12 to produce an edge list enlarged to n times in magnification. The vector data transmitted from the vector production section 12 include a Fill instruction for filling up the inside of the vector data and a Stroke instruction for drawing a straight line or a curved line designated by the vector data. If the vector data transmitted is a Fill instruction, the graphic edge list production section 14 produces an edge list processed in the magnification of n times the actual size. On the other hand, the vector data is a Stroke instruction, the graphic edge list production section 14 produces an outline vector of the received vector data using parameters of a line width, a line end shape and a connection shape and processes the outline vector in the magnification of n times the actual size to produce an edge list. FIGS. 3(A) to 3(C) illustrates an edge list produced by enlarging the size to twice. If vector data, for example, indicated in FIG. 3(A) are inputted to the graphic edge list production section 14, each vector of the vector data is enlarged to twice as seen in FIG. 3(B), and then, edges on individual scanning lines, that is, intersecting points between scanning lines and the vectors are calculated based on the thus enlarged vectors to produce such an edge list as seen in FIG. 3(C). In the edge list, a start point sx and an end point ex of an area to be filled up are stored corresponding to each scanning line. In this instance, data of a color and a density value of the area to be filled up can be stored together. By such enlargement processing and production of an edge list as described above, the amount of data of an edge list in the image drawing apparatus of the present invention is increased only in that the number of scanning lines is increased to twice and consequently the amount of data is increased to twice while the number of dots of an image is conventionally increased to four times by enlargement to twice. Besides, the amount of data is smaller with data of an edge list than with raster data, and accordingly, the memory capacity can be decreased remarkably.

The gray scale processing section 15 receives the edge list produced by the graphic edge list production section 14 and processed in the magnification of n times the actual size and generates, referring to the edge list in units of n scanning lines, a new edge list with which a portion discriminated as an edge of a figure is to be drawn in a half tone when necessary to effect gray processing. The gray processing will be hereinafter described. Since the gray processing uses an edge list to produce a new edge list, the number of access times can be reduced considerably to achieve a high speed operation comparing with the conventional method wherein raster data are successively accessed.

The clipping processing section 16 processes the edge list produced by the gray scale processing section 15 by clipping processing. The clipping processing can be performed by modifying, referring to a start point and an end point of the edge list, the coordinate values of the start point and the end point outside a clipping area to coordinate values at the opposite ends of the clipping area. The edge list after clipping is sent to the edge list merging section 17. The edge list merging section 17 stores the edge list, which has been processed and transmitted thereto for each figure, into the edge list memory 18 for each page. Upon such storage, an edge list of an entire one page stored already is compared in positional relationship with the edge list being inputted at present, and when the two edge lists partially overlap with each other, the edge list memory 18 is re-written preferentially with the edge list being inputted at present. The rasterizing section 19 reads out an edge list from the edge list memory 18 and writes a result of the raster development into the page memory 20. The printer 21 reads out and prints the raster data in synchronism with scanning thereof from the page memory 20. The outputting apparatus is not limited to a printer and may alternatively be a display device or some other device, or the output may be inputted to some other processing means.

The gray processing performed by the gray scale processing section mentioned above will be described. FIGS. 4 to 15 illustrates an example of gray processing. Here, the example wherein an edge list processed in the magnification of 2, that is, in the twofold size, is received and processed by the gray processing is illustrated. In the present gray processing, some processes are performed for each edge list of two scanning lines, and then different processes are performed depending upon the difference in positional relationship between the X coordinate axis values of the edge list in units of two dots, whereafter a color averaged in gradation is applied to the edge list depending upon the difference between the two dots. In other words, an edge list is produced so that a picture element may be drawn with a density determined in accordance with the number of dots in four dots involved in two dots in two scanning lines.

Figure 4:
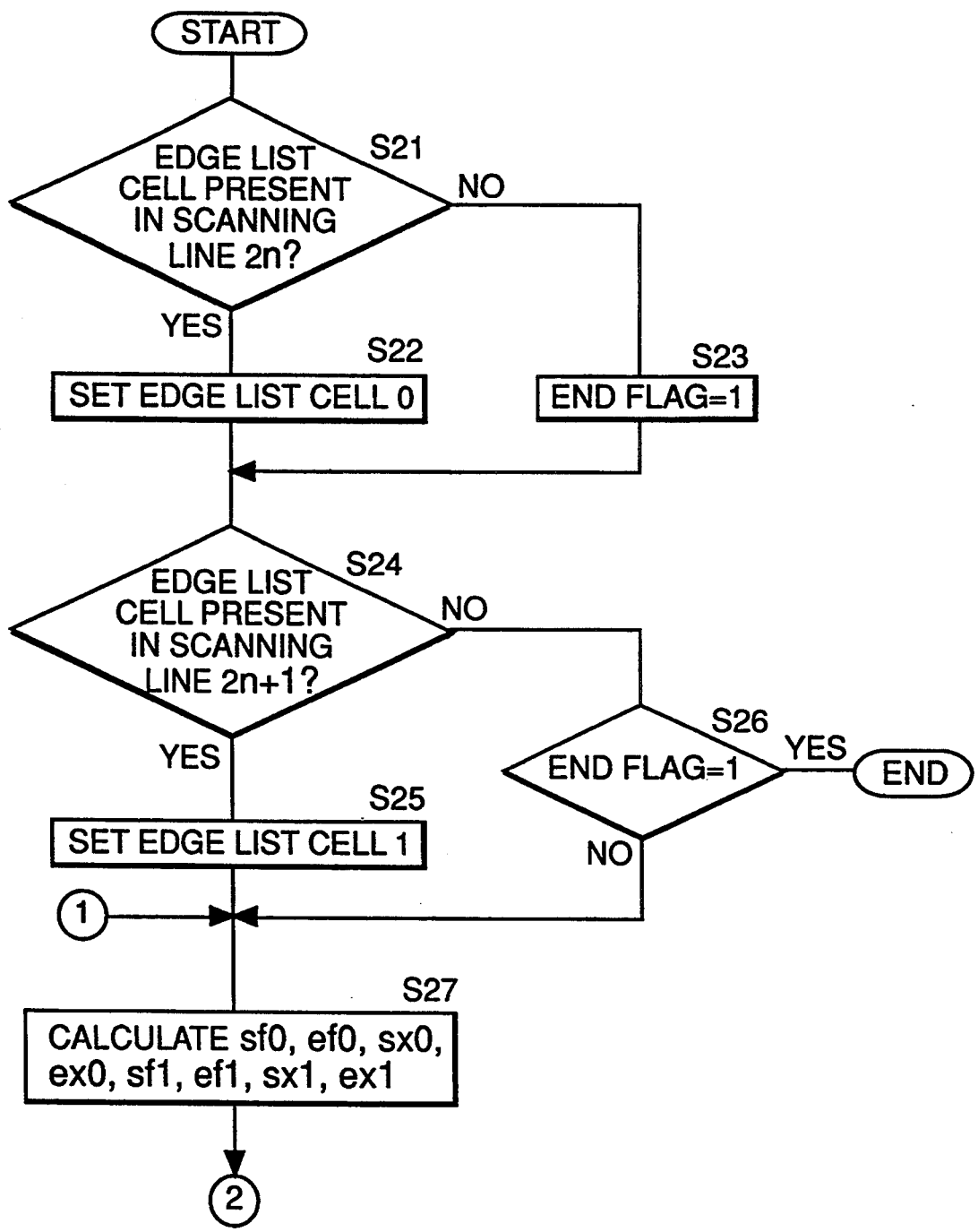
FIGS. 4 to 14 are flow charts illustrating gray processing of the image drawing apparatus of FIG. 1.

Referring first to FIG. 4, it is first determined at step S21 whether or not there exist data in an even-numbered scanning line of an image enlarged to two times in magnitude, that is, in a $2n$ line. If such data exist, the first edge list cells of the scanning lines $2n$ are set as edge list cells 0 at step S22. On the contrary if such data do not exist, an end flag is set to 1 at step S23. Then at step S24, it is determined whether there exists data of the edge list in an odd-numbered scanning line of the image enlarged to two times in magnitude, that is, in the $2n+1$ line. Then, if such data exists, the first edge list cell of the scanning line $2n+1$ are set as edge list cells 1 at step 25. But, on the contrary, if such data do not exist, the end flag is referred to at step S26, and if the end flag is 1, then it is determined that no edge data exists in the odd-numbered line and the even-numbered line. Consequently, the processing for the two scanning lines is ended, and processing for the next two scanning lines is started.

Figure 15A:
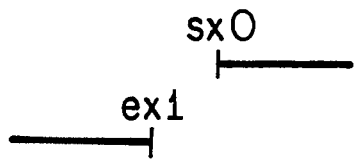
FIGS. 15(A) to 15(G) are diagrammatic views illustrating the gray processing of FIGS. 4 to 14.
Figure 15B:
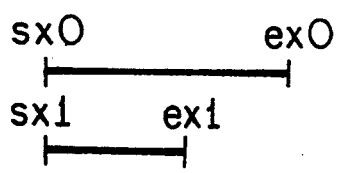
Figure 15C:
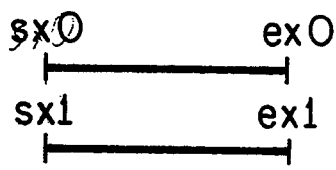
Figure 15D:
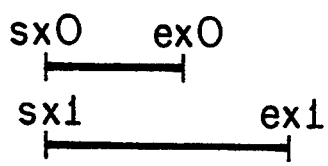
Figure 15E:
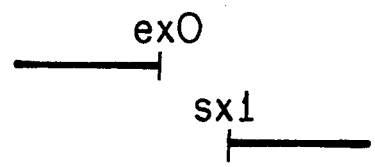
Figure 15F:
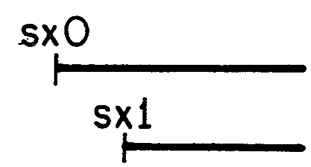
Figure 15G:
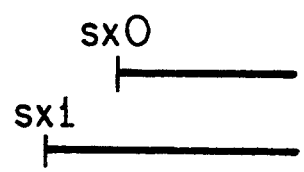

When it is determined at step S21 or S24 that there exists an edge list, the processing beginning with step S27 is entered. First at step S27, the edge list cell of the scanning line $2n$ is set as the present edge list cell 0 and the edge list cell of the scanning line $2n+1$ is set as the present edge list cell 1, and the values obtained by dividing the X coordinate values of the start points of the edge list cells by 2 are set as sx0 and sx1 while the remainders then are set as sf0 and sf1, respectively. Further, the values obtained by dividing the X coordinate values of the end points of the edge list cells by 2 are set as ex0 and ex1 while the remainders then are set as ef0 and ef1, respectively. Relationships of the values of sx0, sx1, ex0 and ex1 then are classified into different cases, and thereafter, different processes will be applied to the difference cases. The classification in this instance is illustrated in FIGS. 15(A) to 15(G). Referring to FIGS. 5 and 15(A) to 15(G), when it is determined sx0>ex1 at step S28, this represents the case wherein the present edge list cell 0 and the present edge list cell 1 have no continuity in the vertical direction and the edge list cell 0 is present on the right side with respect to the edge list cell 1 as shown in FIG. 15(A). In this instance, an edge on the upper side of a half tone with respect to the edge list cell 1 is produced. Then, determined at step S29 is the case wherein the difference between the X coordinates of the start points of the edge list cells is within a one dot distance and the end point of the edge list cell 0 is present on the right side by a distance greater than a two dot distance with respect to the end point of the edge list cell 1 as shown in FIG. 15(B). Determined at step S30 is the case wherein The difference between the X coordinates of the start points and the end points of the edge list cells is within a one dot distance as shown in FIG. 15(C). Determined at step S31 is the case wherein the difference between the X coordinates of the start points of the edge list cells is within a one dot distance and the end point of the edge list cell 0 is present on the left side by a distance greater than a two dot distance with respect to the end point of the edge list cell 1 as shown in FIG. 15(D). Determined at step S32 is the case wherein sx1>ex0, that is, there is no continuity between the edge list cell 0 and the edge list cell 1 in the vertical direction and the edge list cell is present on the left side with respect to the edge list cell 1 as shown in FIG. 15(E). Determined at step S33 is the case wherein the start point of the edge list cell 0 is present on the left side with respect to the start point of the edge list cell 1 and they are continuous in the vertical direction as shown in FIG. 15(F). Determined at step S34 is the case wherein the start point of the edge list cell is present on the right side with respect to the start point of the edge list cell 1 and they are continuous in the vertical direction as shown in FIG. 15(G). In the cases of determination at steps S33 and 34, processing for left portions of the edge list cells is performed, and then the start points of the edge list cells are adjusted and processing for such cases of the edge list cells as illustrated in FIGS. 15(B) to 15(D) described above is performed to complete processing of the entire edge list cells. Step S35 relates to processing for the case wherein no edge list cell 0 is present, and step S37 relates to processing when no edge list cell 1 is present. In the last two cases, it is determined that the edge list cells relate to the top end or the bottom end of the figure, and an edge of a half tone is produced using only data of an existing edge list cell.

Figure 5:
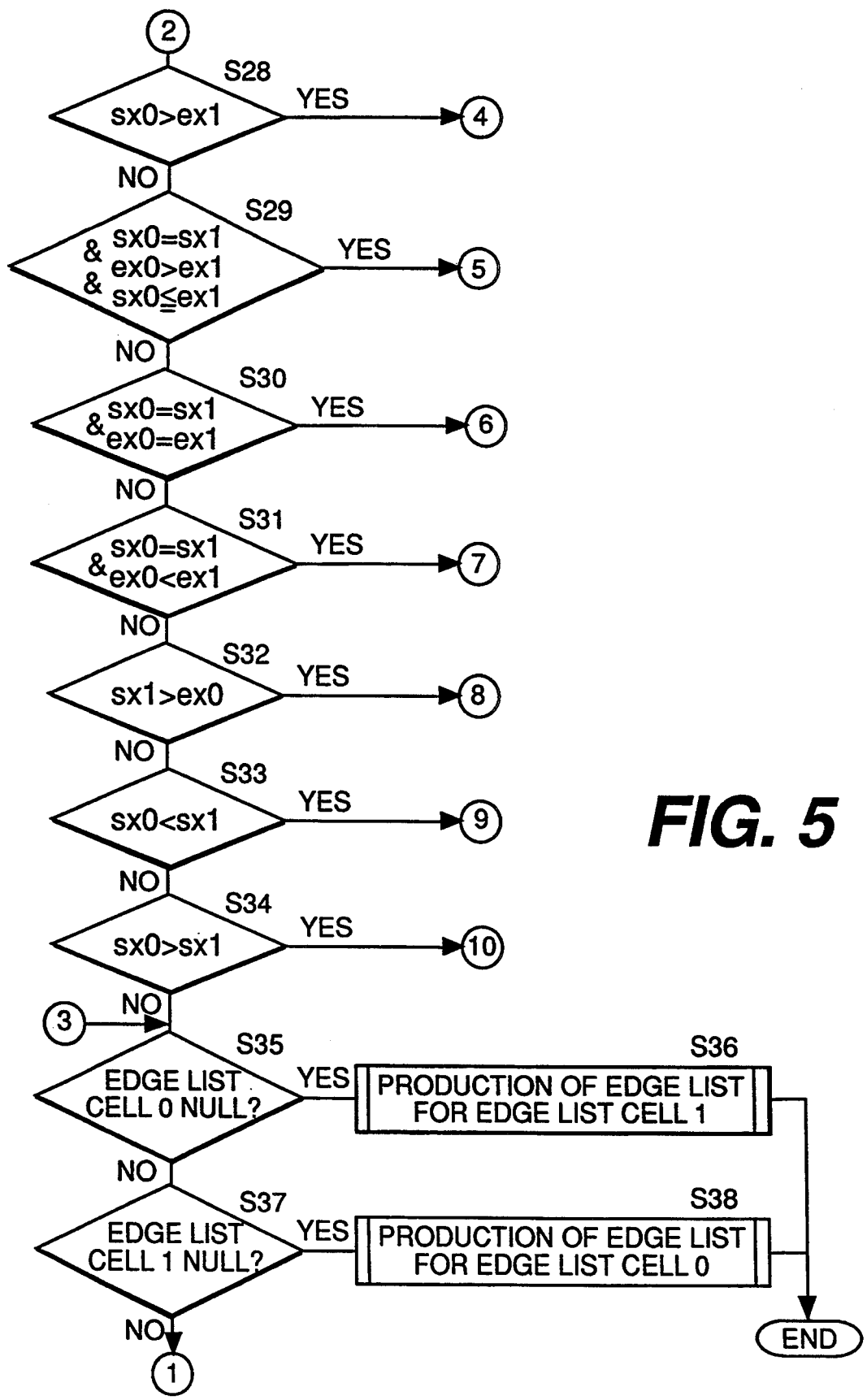
Figure 6:
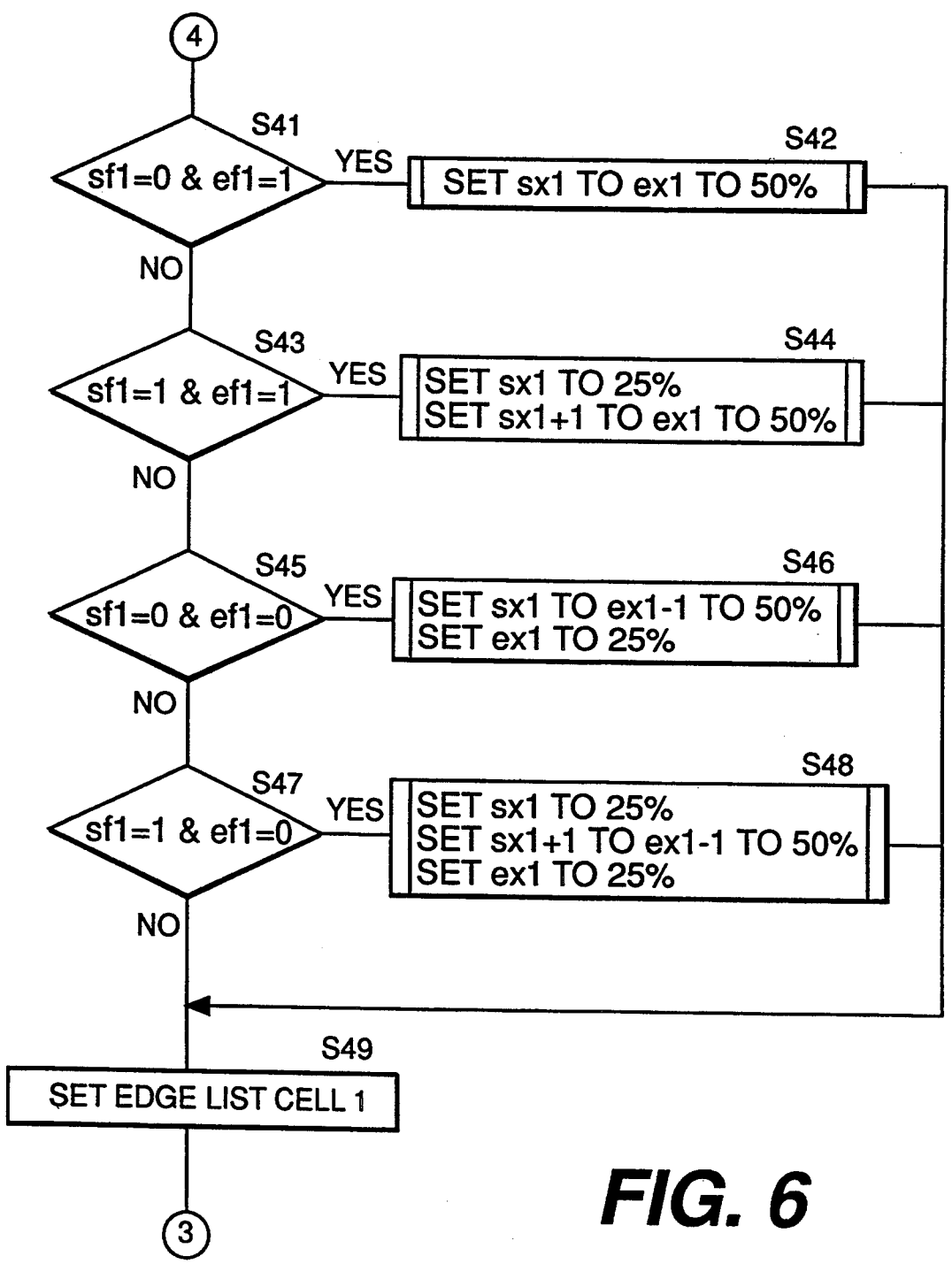

The processes for the cases described above with reference to FIGS. 15(A) to 15(G) will be successively described below. First, in the case wherein the present edge list cell 0 and the present edge list cell 1 do not have continuity in the vertical direction and the edge list cell 0 is present on the right hand side with respect to the edge list cell 1 as shown in FIG. 15(A), gray processing is performed for the edge list cell 1. In particular, the remainders sf1 and el1 obtained by dividing the start point and the end point of the edge list cell 1 are referred to. Referring to FIG. 6, when it is determined at step S41 that sf1=0 and ef1=1, since this signifies that all dots are present in the section from sx1 to ex1, an edge list is produced at step S42 so that the image may be drawn in the section with the density of 50% with respect to the density of the figure to be drawn. When it is determined at step S43 that sf1=1 and ef1=1, since only one of two dots is present at the start point sx1 of the edge, an edge list is produced at step S44 so that the image may drawn with the density of 25% of the density of the figure to be drawn only at the point of the start point sx1 of the edge and then with the density of 50% in the remaining section from sf1=1 to ex1. When it is determined at step S45 that sf1=1 and ef1+0, since only one of two dots is present at the end point ex1 of the edge, an edge list is produced at step S46 so that the image may be drawn with the density of 50% in the section from the start point sx1 of the edge to another point ex1−1 just prior to the last end ex and then with the density of 25% at the end point ex1. When it is determined that sf1=1 and ef1=0, since only one of two dots is present at each of the start point sf1 and the end point ef1 of the edges, an edge list is produced at step S48 so that the image may be drawn with the density of 25% at the start point sx1 and the end point ex1 of the edges and then with the density of 50% in the section from sx1+1 to ex1−1 between the start point sx1 and the end point ex1 neither inclusive. After any of the processes is completed, the edge list cell 1 is changed to another edge list cell present subsequently in the same scanning line, and then the process at step S35 of FIG. 5 is performed.

Subsequently, the case wherein the start points sx0 and sx1 of the edge list cells 0 and 1 are equal to each other and the end point ex0 of the edge list cell 0 is present on the right side with respect to the end point ex1 of the edge list cell 1 as shown in FIG. 15(B) will be described. In this instance, it can be considered that the edge list cell 0 may be continuous to another edge list cell in the scanning line $2n+1$. Therefore, gray processing is performed for the section of the edge list cell 1, but for the edge list cell 0, the section of the edge list cell t is removed and a new edge list cell 0 is produced from the remaining portion of the original edge list cell 0, and gray processing is continued using the new edge list cell 0 and the next edge list cell in the scanning line $2n+1$. A difference by one dot sometimes appears with each of the start points sx0 and sx1, and gray processing is performed for the start points. Further, for the end point ex1 of the edge list cell 1, gray processing is performed in accordance with the number of bits belonging to the end point ex1.

Figure 7:
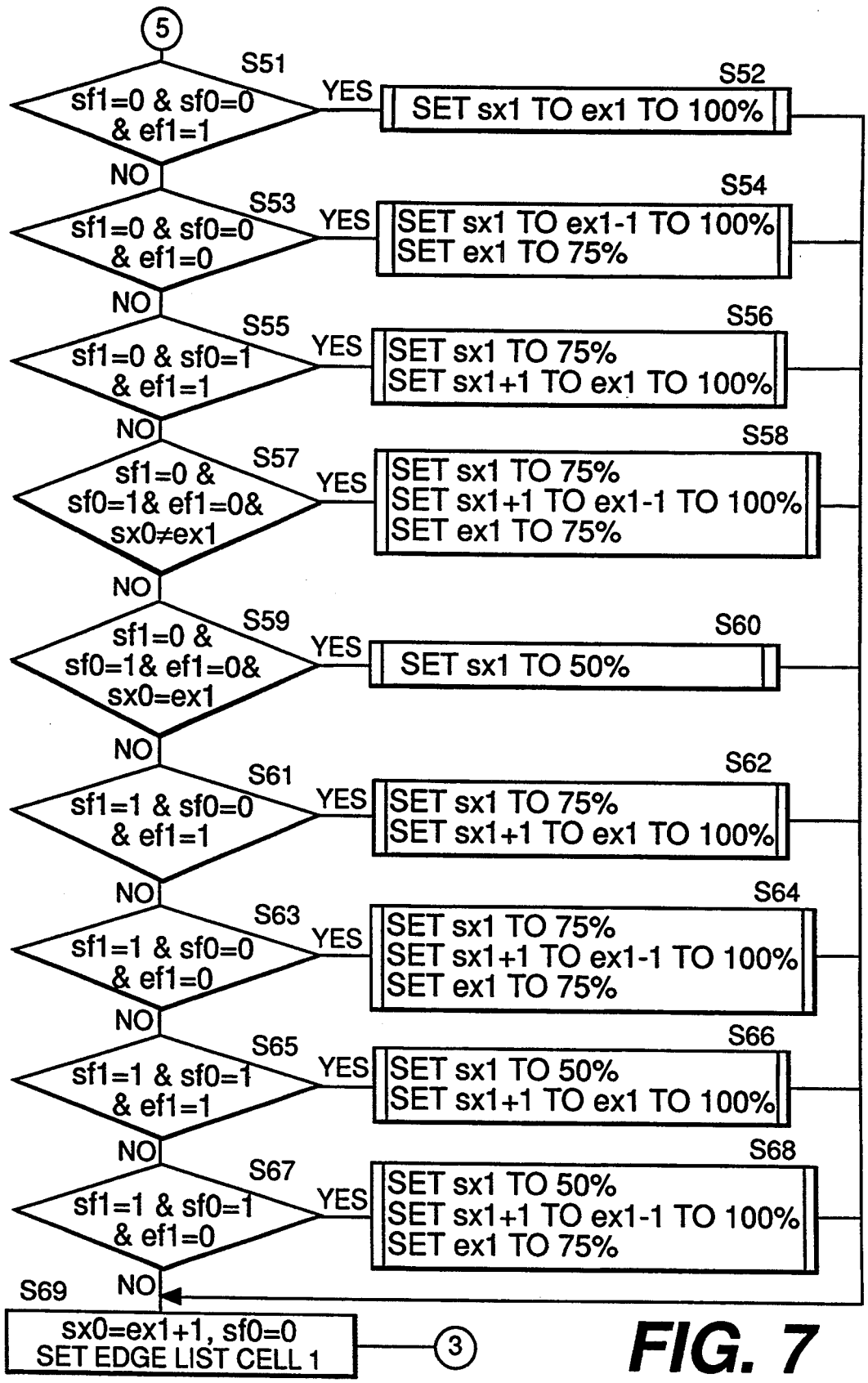
Figure 8:
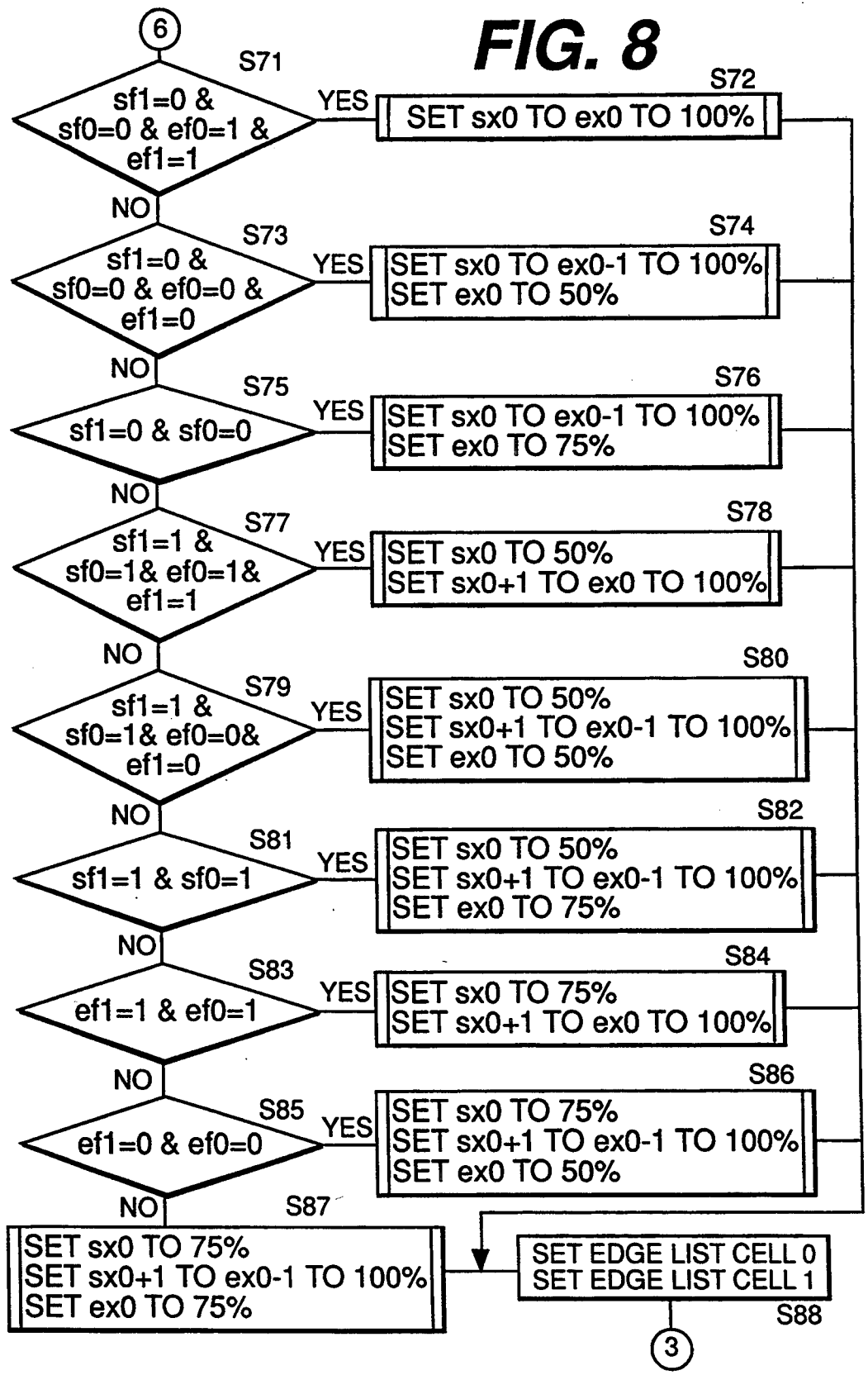

Referring to FIG. 7, steps S51 and S53 relate to the cases wherein sf1=0 and sf0=0, that is, two dots are present at each of the start points sx0 and sx1 of the edge, and particularly, step S51 relates to the case wherein two dots are present at the end point ex1 of the edge list cell 1 while step S53 relates to the case wherein only one dot is present at the end point ex1. In the former case, an edge list is produced at step S52 so that the image may be drawn with the density of 100% in the entire section from the start point sx1 to the end point ex1. On the other hand, in the latter case, en edge list is produced at step S54 so that the image may be drawn with the density of 100% in the section from the start point sx1 to another point ex1−1 just prior to the end point ex1 and then with the density of 75% at the end point ex1.

Steps S55, S57 and S59 relate to the cases wherein sf1=0 and sf0=1, that is, only one dot is present at the start point sx0 of the edge list cell 0. In this instance, since three dots form the start point sx0 (=sx1), half tone processing is performed for the points. For the end point, different processes are performed depending upon the number of dots of the end point ex1 of the edge list cell 1. When it is determined at step S55 that two dots are present at the end point ex1, an edge list is produced at step S55 so that the image may be drawn with the density of 75% at the start point sx1 and then with the density of 100% in the section from another point sx1+1 next to the start point sx1 to the end point ex1. When only one dot is present at the end point ex1, since the case wherein the dot of the start point of the edge list cell 0 and the dot of the end point of the edge list cell 1 are present at the same dot position may possibly appear, it is determined whether or not the start point sx0 of the edge list cell 0 is equal to the end point ex1 of the edge list cell 1. When they are not equal to each other, this is determined at step S57, and then an edge list is produced at step S58 so that the image may be drawn with the density of 75% at the start point sx1 and then with the density of 100% in the section from another point sx1+1 next to the start point sx1 to a further point ex1−1 just prior to the end point ex1 and finally with the density of 75% at the end point ex1. When it is determined at step S59 that sx0 is equal to ex1, since this is the case wherein sx1 and ex1 are equal to each other, an edge list is produced at step S60 so that the image may be drawn with the density of 50% only at the start point sx1.

Steps S61 and S63 relate to the cases wherein sf1=1 and sf0=0, that is, only one dot is present at the start point sx1 of the edge list cell 1. In this instance, since three dots form the start point sx1 (=sx0), half tone processing is performed for the point. For the end point, different processes are performed depending upon the number of dots of the end point ex1 of the edge list cell 1. When it is determined at step S61 that two dots are present at the end point ex1, an edge list is produced at step S6 so that the image may be drawn with the density of 75% at the start point sx and then with the density of 100% in the section from another point sx1+1 next to the start point sx1 to the end point 3x1. When it is determined at step S63 that only one dot is present at the end point ex1, an edge list is produced at step S64 so that the image may be produced with the density of 75% at the start point sx1 and then with the density of 100% in the section from another point sx1+1 next to the start point sx1 to a further point ex1−1 just prior to the end point ex1 and finally with the density of 75% at the end point ex1.

Steps S65 and 67 relate to the cases wherein sf1=1 and sf0=1, that is, only one dot is present at both of the start points of the edge list cell 0 and the edge list cell 1. In this instance, since two dots construct the start point sx1 (=sx0), half tone processing is performed for the point. For the end point, different processes are performed depending upon the number of dots at the end point ex1 of the edge list cell 1. When it is determined at step S65 that two dots are present at the end point ex1, an edge list is produced at step S65 so that the image may be drawn with the density of 50% at the start point sx1 and then with the density of 100% in the section from another point sx1+1 next to the start point sx1 to the end point ex1. When it is determined at step S67 that only one dot is present at the end point ex1, an edge list is produced at step S68 so that the image may be drawn with the density of 50% at the start point sx1 and then with the density of 100% from another point sx1+1 next to the start point sx1 to a further point ex1−1 just prior to the end point ex1 and finally with the density of 75% at the end point ex1.

After an edge list is produced at one of the steps S51 to S68 described above in accordance with a respective case, in order to detect a relationship of the portion of the edge list cell 0 longer than the edge list cell 1 to another edge list cell in the scanning line $2n+1$, at step S69, the start point sx0 of the scanning line $2n+1$ is set to another point ex1+1 next to the end point ex1 of the edge list cell 1 and sf0 is set to 0 so that two dots may be present at the point ex1+1, and then a next edge cell in the scanning line $2n+1$ is set as a new edge list cell 1. Thereafter, the processing at step S35 in FIG. 5 is performed.

Subsequently, the case wherein the start points and the end points of the edge list cells are individually equal to each other as shown in FIG. 15(C) will be described. In this instance, gray processing is performed at each of the start points and the end points of the edge list cells in accordance with the number of dots belonging to the point.

Steps S71, S73 and S75 relate to the cases wherein sf1=0 and sf0=0, that is, two dots are present at each of the start points sx0 and sx1 of the edge. In particular, step S71 relates to the case wherein two dots are present at each of the end points of the edge; step S73 relates to the case wherein one dot is present at each of the end points of the edge; and step S75 relates to the case wherein the end points of the edges have any other dot construction, that is, two dots are present at the end point of the edge dot cell 0 while only one dot is present at the end point of the edge dot cell 1 or vice versa. When it is determined at step S71 that two dots are present at each of the start points and the end points, an edge list is produced at step S72 so that the image may be drawn with the density of 100% in the entire section from the start point sx0 to the end point ex0. When it at determined at step S73 that two dots are present for each of the start points and one dot is present at each of the end points, an edge list is produced at step S74 so that the image may be drawn with the density of 100% in the section from the start point sx0 to another point ex0−1 just prior to the end point ex0 and then with the density of 50% at the end point ex0. When it is determined at step S75 that two dots are present at each of the start points and the two lines include one dot and two dots at the end points thereof, an edge list is produced at step S76 so that the image may be drawn with the density of 100% in the section from the start point sx0 to another point ex0−1 just prior to the end point ex0 and then with the density of 75% at the end point ex0.

Steps S77, S79 and S81 relate to the cases wherein only one dot is present at each of the start points of the edge list cells. In this instance, since two dots constitute the end point sx0 (=sx1), half tone processing is performed at the point. For the end point, different processes are performed depending upon the numbers of dots at the end points of the edge list cells. When it is determined at step 77 that two dots are present at each of the end points, an edge list is produced at step S78 so that the image may be drawn with the density of 50% at the start point sx0 and then with the density of 100% in the section from another point sx0+1 next to the start point sx0 to the end point ex0. When it is determined at step S79 that only one dot is present at each of the end points, an edge list is produced at step S80 so that the image may be drawn with the density of 50% at the start point sx0 and then with the density of 100% in the section from another point sx0+1 next to the start point sx0 to a further point ex0−1 prior to the end point ex0 and finally with the density of 50% at the end point ex0. When it is determined at step S81 that the two lines include one dot and two dots at the end points thereof, an edge list is produced at step S82 so that the image may be produced with the density of 50% at the start point sx0 and then with the density of 100% in the section from another point sx0+1 next to the start point sx0 to a further point ex0−1 just prior to the end point ex0 and finally with the density of 75% at the end point ex0.

Steps S83 and S85 relate to the cases wherein sf1=1 and sf0=0 or sf1=0 and sf0=1, that is, two dots are present at the start point of one of the two edge list cells and one dot is present at the start point of the other edge list cell. In this instance, since three dots form the start point sx0 (=sx1), half tone processing is performed for the point. For the end point, different processes are performed depending upon the numbers of dots at the end points of the edge list cells. When it is determined at step S83 that two dots are present at each of the end points, an edge list is produced at step S84 so that the image may be drawn with the density of 75% at the start point sx0 and then with the density of 100% in the section from another point sx0+1 next to the start point sx0 to the end point ex0. When it is determined at step S85 that only one dot is present at each of the end points, an edge list is produced at step S86 so that the image may be drawn with the density of 75% at the start point sx1 and then with the density of 100% in the section from another point sx1+1 next to the start point sx1 to a further point ex1−1 just prior to the end point ex1 and finally with the density of 50% at the end point ex1. In any other case wherein the two lines include one dot and two dots at the end points thereof, an edge list is produced at step S87 so that the image may be drawn with the density of 75% and then with the density of 100% in the section from another point sx1+1 next to the start point sx1 to a further point ex1−1 just prior to the end point ex1 and finally with the density of 75% at the end point ex1.

After an edge list is produced at one of the steps S71 to S87 described above in accordance with a respective case, next edge list cells in both of the scanning line 2n and the scanning line 2n+1 are set as new edge list cells 0 and 1 at step S88. Thereafter, the processing at step S35 in FIG. 5 is performed.

Subsequently, the case wherein the start points sx0 and sx1 of the edge list cells are equal to each other and the end point ex0 of the edge list cell 0 is present on the left side with respect to the end point ex1 of the edge list cell 1 as shown in FIG. 15(D) will be described. In this instance, the edge list cell 1 may possibly be continuous to another edge list cell in the scanning line 2n. Therefore, gray processing is performed for the section of the edge list cell 0, and for the edge list cell 1, the section of the edge list cell 1 corresponding to the edge list cell 0 is removed while a new edge list cell 1 is produced from the remaining portion of the edge list cell 1. Then, gray processing is continued using the new edge list cell 1 and the next edge list cell of the scanning line 2n. It sometimes occurs that a difference of one dot is produced for each of the start points sx0 and sx1, and gray processing is performed for the start point. Further, also for the ex0 of the edge list cell 0, gray processing is performed in accordance with the number of dots belonging to ex0.

Figure 9:
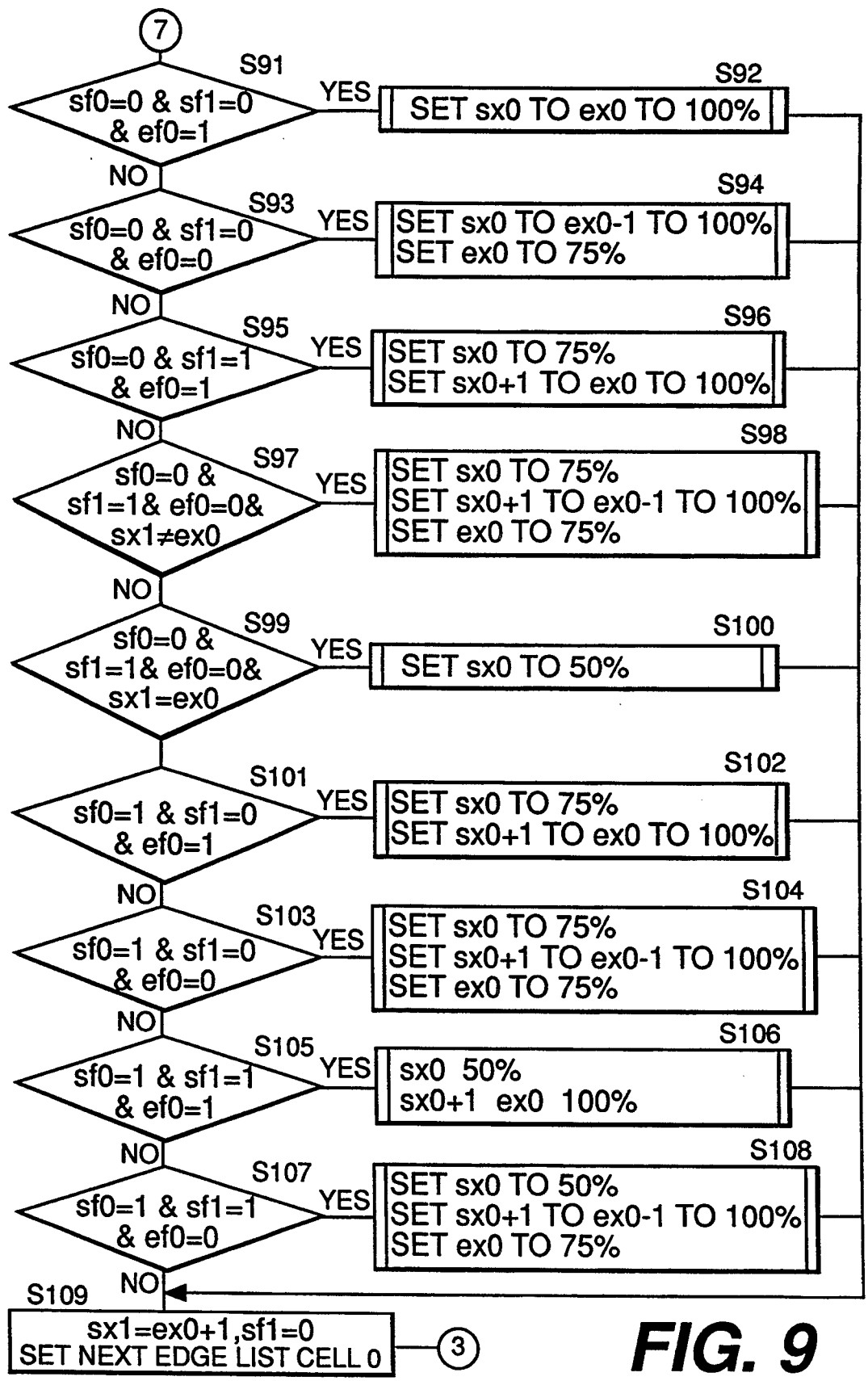

Referring to FIG. 9, steps S91 and S93 relate to the cases wherein sf0=0 and sf1=0, that is, two dots are present at each of the start points sx0 and sx1 of the edge. In particular, step S91 relates to the case wherein two dots are present at the end point of the edge list cell 0, and step S93 relates to the case wherein one dot is present for the end point ex0. In the former case, an edge list is produced at step S92 so that the image may be drawn with the density of 100% in the entire section from the start point sx0 to the end point ex0. On the other hand, in the latter case, an edge list is produced at step S94 so that the image may be drawn with the density of 100% in the section from the start point sx0 to another point ex0−1 just prior to the end point ex0 and then with the density of 75% at the end point ex0.

Steps S95, S97 and S99 relate to the cases wherein sf0=0 and sf1=1, that is, only one dot is present at the start point sx1 of the edge list cell 1. In this instance, since three dots form the end point sx0 (=sx1), half tone processing is performed at the point. For the end point, different processes are performed at the end point ex0 of the edge list cell ex0. When it is determined at step S95 that two dots are present at the end point ex0, an edge list is produced at step S96 so that the image may be drawn with the density of 75% at the start point sx0 and then with the density of 100% in the section from another point sx0+1 next to the start point sx0 to the end point ex0. When only one dot is present at the end point ex0, the dot at the start point of the edge list cell 1 and the dot at the end point of the edge list cell 0 may possibly be at the same position as each other, and accordingly, it is determined whether or not the start point sx1 of the edge list cell 1 is equal to the end point ex0 of the edge list cell 0. When they are not equal to each other, this is determined at step S97, and then an edge list is produced at step S98 so that the image may be drawn with the density of 75% at the start point sx0 and then with the density of 100% in the section from another point sx0+1 next to the start point sx0 to a further point ex0−1 just prior to the end point and finally with the density of 75% at the end point ex0. When it is determined at step S99 that sx1 and ex0 are equal to each other, since this is the case wherein sx0 and ex0 are equal to each other, an edge list is produced at step S100 so that the the image may be drawn with the density of 50% at the start point sx0.

Steps S101 and S103 relate to the cases wherein sf0=1 and sf1=0, that is, only one dot is present at the start point sx0 of the edge list cell 0. In this instance, since three dots form the start point sx0 (=sx1), half tone processing is performed at the point. For the end point, different processes are performed depending upon the numbers of dots at the end point ex0 of the edge list cell 0. When it is determined at step 101 that two dots are present at the end point ex0, an edge list is produced at step S102 so that the image may be drawn with the density of 75% at the start point sx0 and then with the density of 100% in the section from another point sx0+1 next to the start point sx0 to the end point ex0. When it is determined at step S103 that only one dot is present at the end point ex0, an edge list is produced at step S104 so that the image may be drawn with the density of 75% at the start point sx0 and then with the density of 100% in the section from another point sx0+1 next to the start point sx0 to a further point ex0−1 just prior to the end point ex0 and finally with the density of 75% at the end point ex0.

Steps S105 and S107 relate to the cases wherein sf0=1 and sf1=0, that is, only one dot is present at each of the start points of the edge list cell 0 and the edge list cell 1. In this instance, since two dots form the start point sx0 (=sx1), half tone processing is performed for the point. For the end point, different processes are performed depending upon the numbers of dots at the end point ex0 of the edge list cell 0. When it is determined at step S105 that two dots are present at the end point ex0, an edge list is produced at step S106 so that the image may be drawn with the density of 50% at the start point sx0 and then with the density of 100% in the section from another point sx0+1 next to the start point sx0 to the end point ex0. When it is determined at step S107 that only one dot is present at the end point ex0, an edge list is produced at step S108 so that the image may be drawn with the density of 50% at the start point sx0 and then with the density of 100% in the section from another point sx0+1 next to the start point sx0 to a further point ex0−1 just prior to the end point ex0 and finally with the density of 75% at the end point ex0.

After an edge list is produced at one of the steps S91 to S108 described above in accordance with a respective case, in order to detect a relationship of the portion of the edge list cell 1 longer than the edge list cell 0 to another edge list cell in the scanning line 2n, at step S109, the start point sx1 of the edge list cell 1 is set to another point ex0+1 next to the end point of the edge list cell 0 and sf1 is set to 0 so that two dots may be present at the point ex0+1, and then the next edge cell in the scanning line 2n is set as a new edge list cell 0. Thereafter, the processing at step S35 in FIG. 5 is entered.

Subsequently, the case wherein the end point ex0 of the edge list cell 0 is present on the left side with respect to the start point sx1 of the edge list cell 1 and they are not continuous in the vertical direction will be described. In this instance, it is determined that the edge list cell 0 is an end in the vertical direction, and gray processing is performed for the edge list cell 0.

Figure 10:
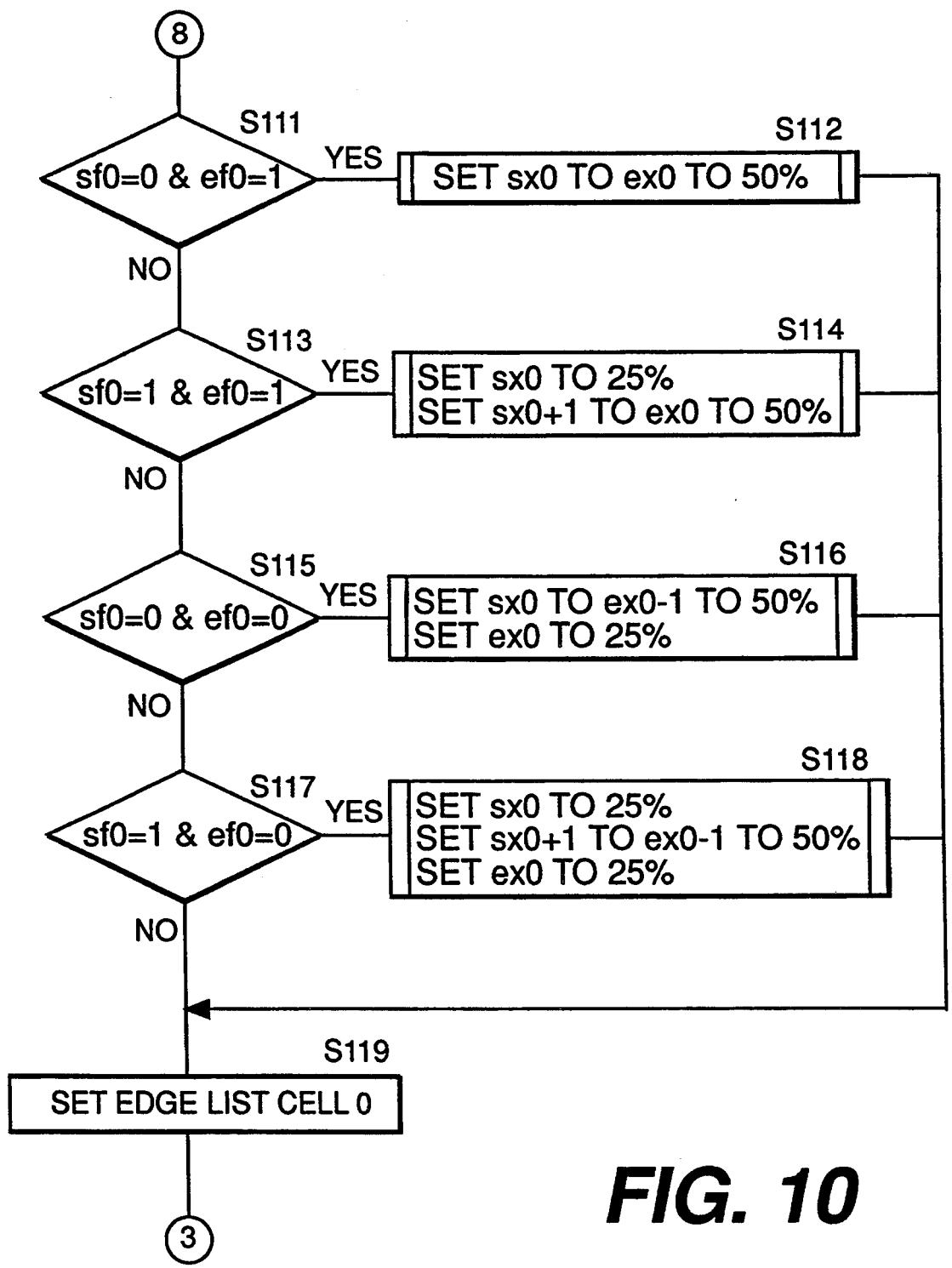

Referring to FIG. 10, when it is determined at step Sill that two dots are present at each of the start point sx0 and the end point ex0 of the edge list cell 0, an edge list is produced at step S112 so that the image may be drawn with the density of 50% in the section between the start point sx0 and the end point ex0. When it is determined at step S113 that two dots are present at the end point ex0 of the edge list cell 0 but only one dot is present at the start point sx0, an edge list is produced at step S114 so that the image may be drawn with the density of 25% at the start point sx0 and then with the density of 50% in the section from another point sx0+1 next to the start point sx0 to the end point ex0. When it is determined at step S115 that two dots are present at the start point sx0 of the edge list cell 0 but only one dot is present at the end point ex0, an edge list is produced at step S116 so that the image may be drawn with the density of 50% in the section from the start point sx0 to another point ex0−1 just prior to the end point ex0 and then with the density of 25% at the end point ex0. When it is determined at step S117 that only one is present at both of the start point sx0 and the end point ex0 of the edge list cell 0, an edge list cell is produced at step S118 so that the image may be drawn with the density of 25% at the start point sx0 and then with the density of 50% in the section from another point sx0+1 next to the start point sx0 to a further pint ex0−1 just prior to the end point ex0 and finally with the density of 25% at the end point ex0. After the processing for production of an edge list described above is completed, the edge list cell of the scanning line is set to a next edge cell, and the processing at step S35 of FIG. 5 is entered.

Subsequently, the case wherein the start point of the edge list cell 0 is present on the left side with respect to the start point of the edge list cell 1 and the edge list cells 0 and 1 are continuous in the vertical direction will be described. In this instance, gray processing is first performed only for a portion of the edge list cell 0 on the left side with respect to the start point of the edge list 1, and then gray processing for both of the edge list cells beginning with the same start point is performed.

Figure 11:
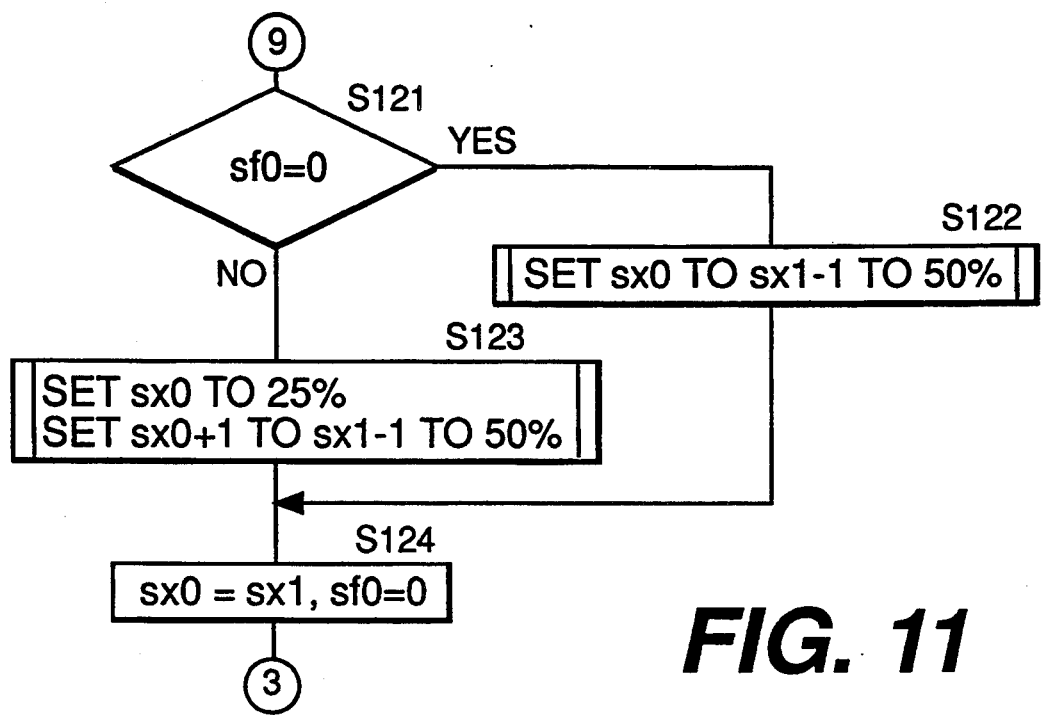

Referring to FIG. 11, when it is determined at step S121 that two dots are present at the start point sx0 of the edge list cell 0, an edge list is produced at step S122 so that the image may be drawn with the density of 50% in the section from the start point sx0 of the edge list cell 0 to another point sx1−1 just prior to the start point sx1 of the edge list cell 1. In any other case, that is, when only one dot is present at the start point sx0 of the edge list cell 0, an edge list is produced at step S123 so that the image may be drawn with the density of 25% at the start point sx0 of the edge list cell 0 and then with the density of 50% in the section from another point sx0+1 next to the start point sx0 of the edge list cell 0 to a further point sx1−1 just prior to the start point sx1 of the edge list cell 1. After one of the two processes for production of an edge list is performed, at step S124, the start point of the edge list cell 0 is set to the start point sx1 of the edge list cell 1 and the value of sf0 is set so that two dots may be present at the point, whereafter the processing at step S35 of FIG. 5 is performed.

Subsequently, the case wherein the start point of the edge list cell 0 is present on the right side with respect to the start point of the edge list cell 1 and they are continuous in the vertical direction as shown in FIG. 15(G) will be described. In this instance, gray processing is first performed only for a portion of the edge list cell 1 on the left side of the start point of the edge list cell 0, and then the start points of the two edge list cells are made equal to each other and gray processing is performed for them.

Figure 12:
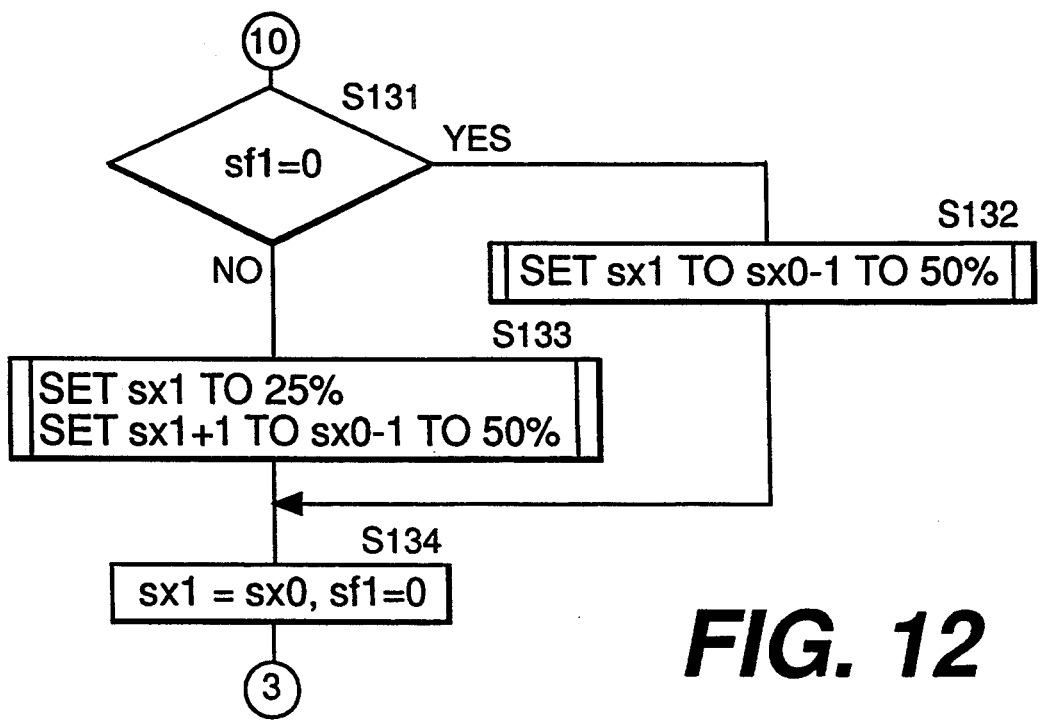

Referring to FIG. 12, when it is determined at step S131 that two dots are present at the start point sx1 of the edge list cell 1, an edge list is produced at step S132 so that the image may be drawn with the density of 50% in the section from the start point sx1 of the edge list cell 1 to another point sx0−1 just prior to the start point sx0 of the edge list cell 0. In any other case, that is, in the case wherein only one dot is present at the start point sx1 of the edge list cell 1, an edge list is produced at step S133 so that the image may be drawn with the density of 50% in the section from a point sx1+1 next to the start point sx1 of the edge list cell 1 to another point sx0−1 just prior to the start point sx0 of the edge list cell 0. After one of the two processes for production of an edge list is performed, at step S134, the start point of the edge list cell 1 is set to the start point sx0 of the edge list cell 0 and the value of sf1 is set so that two dots may be present at the point, whereafter the processing at step S35 of FIG. 5 is performed.

Subsequently, the case wherein only one of the edge list cell 0 and the edge list cell 1 is present will be described. When only one edge list cell is present, an edge list is produced using only the edge list cell thus present. In this instance, it is considered that the edge list thus present is at the top end or the bottom end of the figure to be drawn, the entire section is drawn in a half tone.

Figure 13:
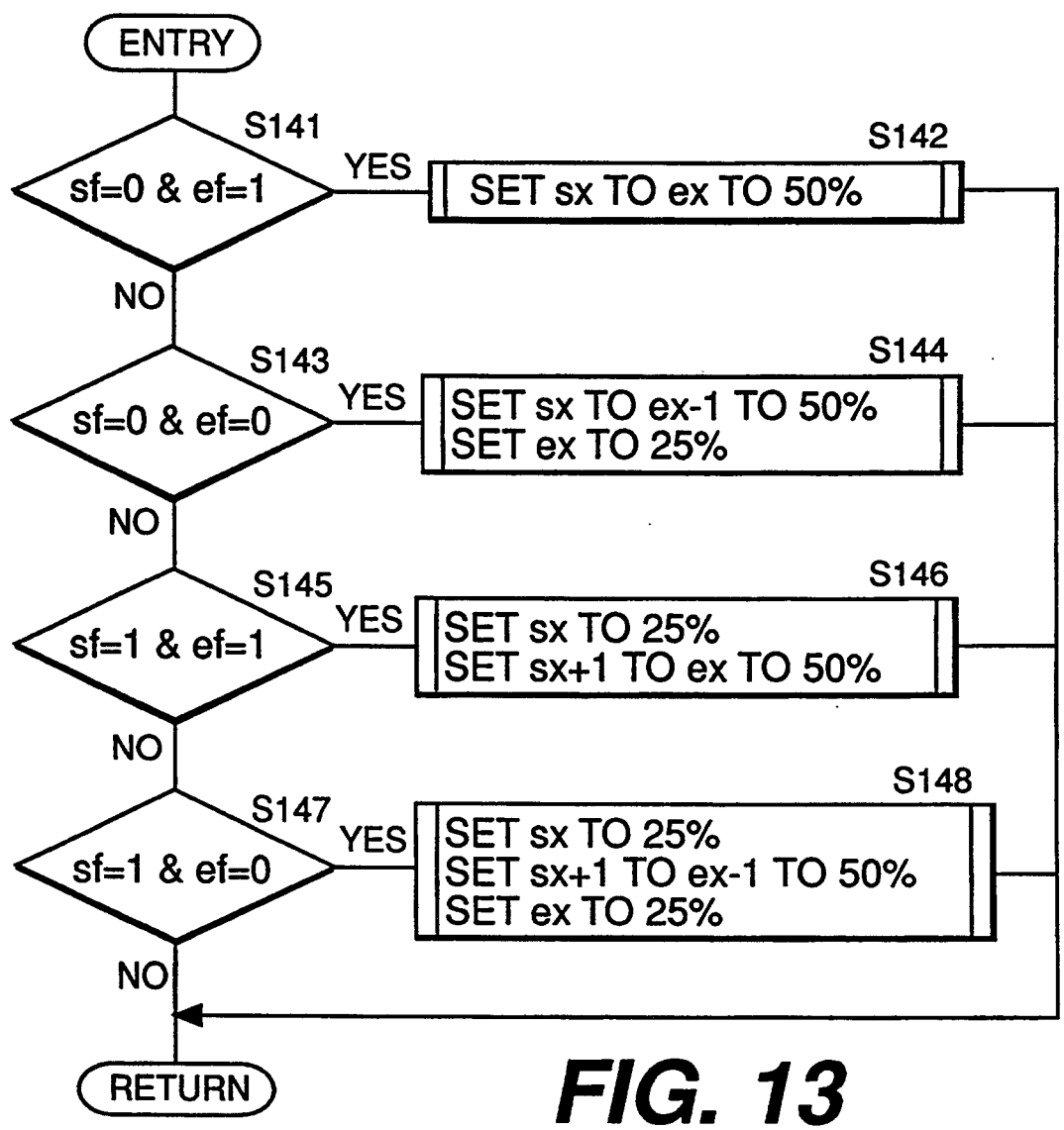

Referring to FIG. 13, when it is determined first at step S141 that two dots are present at both of the start point sx and the end point ex of the edge list cell, an edge list is produced at step 142 so that the image may be drawn with the density of 50% in the section between the start point sx and the end point ex. When it is determined at step S143 that two dots are present at the start point of the edge list cell but only one dot is present at the end point, an edge list is produced at step S144 so that the image may be drawn with the density of 50% in the section from the start point sx of the edge list cell to another point ex−1 just prior to the end point ex and then with the density of 25% at the end point ex. When it is determined at step S145 that two dots are present at the end point of the edge list cell but only one dot is present at the start point, an edge list is produced at step S146 so that the image may be drawn with the density of 25% at the start point sx of the edge list cell and then with the density of 50% in the section from another point sx+1 next to the start point sx to the end point ex. When it is determined at step S147 that only one dot is present at both of the start point and the end point of the edge list cell, an edge list is produced at step S148 so that the image may be drawn with the density of 25% at the start point sx and then with the density of 50% in the section from another point sx+1 next to the start point sx to a further point ex−1 just prior to the end point ex and finally with the density of 25% at the end point ex.

Figure 14:
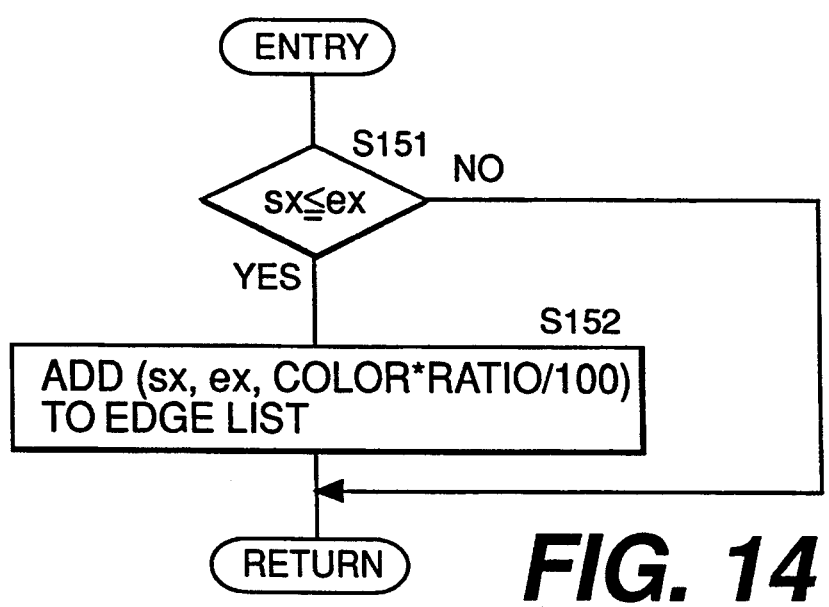

Referring to FIG. 14, in the production of an edge list described above, the start point and the end point of an edge list to be produced are compared in magnitude with each other at step S151, and only when the start point has a value equal to or smaller than the end point, the given start point and end point and the data of a ratio of the density of the image to be drawn are outputted. In this instance, color data of the figure to be drawn may be multiplied by the density ratio, and the data of the color to be drawn may be registered into an edge list.

While the ratio of the density of the image to be drawn which is set upon production of an edge list described above is set in accordance with the number of dots at a point to be drawn, it may be changed suitably in accordance with an outputting condition in each case.

Figures 16, 17A, 17B:
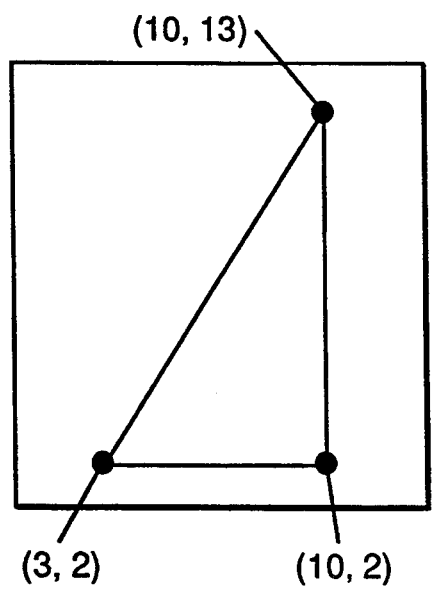
FIG. 16 is a diagrammatic view showing an edge list after gray processing by the image drawing apparatus of FIG. 1.
FIGS. 17(A) and 17(B) are diagrammatic views showing an output image of the image drawing apparatus of FIG. 1.

FIG. 16 shows an edge list after gray processing. Edge lists produced by the gray scale processing section 15 are stored such that data of a start point and an end point of an edge and a density are stored in a mutually corresponding relationship for each scanning line as seen from FIG. 16. When a plurality of edge list data are present in a scanning line, a next one of the data is designated by a pointer. The data structure of the edge list may be a list structure or a table form which has a pointer as a factor. Or, the table structure which does not have a pointer and wherein data are arranged in the order in which they are to be referred to may be employed. FIG. 16 shows the example wherein an edge list for filling up the area in the vectors of the vector data shown in FIG. 3(A) is produced. If, for example, from the vector data shown in FIG. 3(A), vector data enlarged to twice as shown in FIG. 3(B) are produced and then an edge list shown in FIG. 3(C) is produced and inputted to the gray scale processing section 15, the edge list shown in FIG. 16 is produced by such gray processing as described above.

For example, data of the scanning line 9 in FIG. 16 are produced from the data of the scanning lines 18 and 19 in FIG. 3(C). The edge list cell 0 in the scanning line 18 has a start point sx0 at 15/2 with sf0=1 and an end point ex0 at 20/2=10 with ef0=0. Meanwhile, the edge list cell 1 in the scanning line 19 has a start pint sx1 at 16/2=8 with sf1=0 and an end point ex1 at 20/2 with ef1=0. Since sx0<sx1, this corresponds to step S33 in FIG. 5, and accordingly, the processing illustrated in FIG. 11 is performed. Then, since sf0=1, the requirement at step S121 in FIG. 11 is not satisfied, and at step. S123, an edge list to draw the image with the density of 25% at the point of sx0=7 is produced. In this instance, data of the density of 50% for the section between a point sx0+1 next to the start point sx0 of the edge list cell 0 and another point sx1−1 just prior to the start point sx1 of the edge list cell 1 are not produced because sx0+1=8 and sx1−1=7 and the relationship in magnitude between the start point and the end point of the section is reverse. Then at step S124, sx0 is set to sx1, that is, 8, and sf0 is set to 0, and then gray processing is performed again. In the second processing cycle, since sx0=sx1 and ex0=ex1, this corresponds to the requirement at step S73, and accordingly, an edge list is produced at step S74. In particular, an edge list to draw the image with the density of 100% in the section from sx0=8 to ex0−1=9 and then with the density of 50% at ex0=10 is produced. Edge lists are produced similarly for the other scanning lines, and as a result, such an edge list as shown in FIG. 16 is obtained.

FIGS. 17(A) and 17(B) illustrate an output image. A result of an output when vectors illustrated in FIG. 17(A) are inputted to the image data inputting section 11 is illustrated in FIG. 17(B). When such vector data as seen in FIG. 17(A) are inputted, such edge lists as shown in FIG. 16 are produced, and then are developed by raster development into the page memory 20 by way of the clip processing circuit 16, the edge list merging section 17 and the rasterizing section 19 and then outputted to the printer 21. In this instance, dots are printed in such a manner as seen in FIG. 16(B). Thus, an image of a high image quality having edges processed by gray processing and having no striking jaggy can be obtained.

Having now fully described the invention, it will be apparent to one of ordinary skill in the art that many changes and modifications can be made thereto without departing from the spirit and scope of the invention as set forth herein.

What is claimed is:

1. An image drawing apparatus for converting input data into raster information and drawing an image in accordance with the raster information, comprising:

edge list production means for producing a first edge list from the input data, the first edge list having one or more first edge list entries each indicative of line segments defined by crossing points between scanning lines and drawing lines and color density information of respective line segments;

conversion means for converting the first edge list into a second edge list the second edge list containing one or more new entries each indicative of one or more edge portions of the line segments and color density information for each of the edge portions being adjusted for gradation based on first edge list entries for a predetermined number of successive line segments including a line segment having said edge portion(s); and outputting processing means for performing outputting processing in accordance with the second edge list.

2. An image drawing apparatus according to claim 1, wherein each of the first edge list entries includes data of a start point and an end point of a corresponding line segment and data of a color density of the line segment.

3. An image drawing apparatus according to claim 2, wherein for determining the color density information for said edge portion(s), data of start points and end points of the predetermined number of the successive line segments including the line segment having said edge portions(s) are processed by said conversion means.

4. An image drawing apparatus for converting input data into raster information and drawing an image in accordance with the raster information, comprising:

edge list production means for producing a third edge list from the input data, the third edge list having one or more third edge list entries each indicative of line segments defined by crossing points between scanning lines and drawinglines enlarged to n times in size and color density information of respective line segments, n being a natural number equal to or greater than 2;

conversion means for converting the third edge list into a fourth edge list, the fourth edge list containing one or more new entries each indicative of one or more edge portions of the line segments and color density information of the edge portion(s), the color density information for the edge portion(s) being adjusted for gradation based on third edge list entries for n successive line segments relating to a line segment having said each of edge portions; and outputting processing means for performing output processing in accordance with the fourth edge list.

5. An image drawing apparatus according to claim 4, wherein each of the third edge list entries includes data of a start point and an end point of a corresponding line segment and data of a color density of the line segment.

6. An image drawing apparatus according to claim 5, wherein for determining the color density information for said edge portion(s), data of start points and end points of the n successive line segments relating to the line segment having said edge portion(s) are processed by said conversion means.

* * * * *